(12) United States Patent
Sundararajan

(10) Patent No.: US 6,375,468 B1
(45) Date of Patent: Apr. 23, 2002

(54) EDUCATIONAL TOOL

(76) Inventor: Kalyani Sundararajan, 26 Royal Dominion Ct., Bethesda, MD (US) 20817

( * ) Notice: Subject to any disclaimer, the term of this patent is extended or adjusted under 35 U.S.C. 154(b) by 101 days.

(21) Appl. No.: 09/621,665

(22) Filed: Jul. 24, 2000

(51) Int. Cl.$^7$ ................................................. G06C 1/00
(52) U.S. Cl. ........................................................ 434/203
(58) Field of Search ................................ 434/188, 193, 434/195, 196, 198, 199, 200, 203, 204, 205, 206

(56) References Cited

U.S. PATENT DOCUMENTS

| | | |
|---|---|---|
| 380,532 A | 4/1888 | Siefert |
| 452,302 A * | 5/1891 | Denison ..................... 434/203 |
| 465,811 A | 12/1891 | Anderson |
| 826,732 A | 7/1906 | Monachimoff |
| 3,273,262 A | 9/1966 | Smith, Jr. |
| 3,672,072 A | 6/1972 | Akiyama |
| 4,176,472 A * | 12/1979 | Devaney ..................... 434/203 |
| 4,233,757 A | 11/1980 | Narcise |
| 5,334,026 A * | 8/1994 | Ylitalo ........................ 434/203 |

FOREIGN PATENT DOCUMENTS

| | | | |
|---|---|---|---|
| DE | 813081 | * 7/1951 | ................. 434/203 |
| GB | 2270789 | 3/1994 | |

* cited by examiner

Primary Examiner—Jacob K. Ackun, Jr.
Assistant Examiner—Kurt Fernstrom
(74) Attorney, Agent, or Firm—Stephen R. Greiner

(57) ABSTRACT

An educational tool including a rigid frame supporting a pair of parallel rods. A number of beads of equal width are slidably positioned on one of the rods. A reckoning slide is slidably and rotatably positioned on the other of the rods for counting the beads. The reckoning slide has a front side and a rear side, either of which may be selectively brought into view by rotating the reckoning slide. The front side has printed indicia in the form of a first whole number sequence increasing from left-to-right and the rear side has printed indicia in the form of a second whole number sequence increasing from right-to-left.

16 Claims, 1 Drawing Sheet

EDUCATIONAL TOOL

FIELD OF THE INVENTION

The present invention relates generally to devices for the purposes of education and demonstration and, more particularly, to such devices having apertured elements on elongate means.

BACKGROUND OF THE INVENTION

It is a time-honored practice to use small groups of objects as visual aids to teach children basic mathematic skills like: counting, addition and subtraction. Numerous teaching aids have been developed that build upon this concept by retaining a group of objects together in a manner that prevents their loss over time. Typically, these teaching aids have one or more rods with a plurality of beads slidably positioned thereon. Adjacent the rods is often positioned a sequence of numbers that facilitates the counting of the beads and the working out of various mathematics problems proposed by a teacher.

Enlightened teachers have found that their pupils learn mathematics skills in highly individualized ways. Some prefer to count objects arranged in a horizontal row, as would be found in a typical counting aid, from right to left while others prefer to count from left to right. Neither counting method has a particular advantage over the other. Nonetheless, an ingrained, counting preference can make the use of a typical counting aid a difficult task for some children. Thus, the structural characteristics of some counting aids can actually slow the learning of mathematics.

SUMMARY OF THE INVENTION

In light of the problems associated with the known aids for teaching counting and other mathematics skills, it is a principal object of the invention to provide an educational tool that permits a student to solve basic mathematics problems in a personalized manner by permitting him to count from either left-to-right in a "normal" approach or from right-to-left in a "reverse" approach. Provided that the tool is properly used, either approach to counting will provide the same, correct answer to a given mathematics problem in a short period of time.

It is another object of the invention to provide an educational tool of the type described that is self-contained and requires neither additional equipment nor prolonged training to operate effectively.

It is an object of the invention to provide improved elements and arrangements thereof in an educational tool for the purposes described which is uncomplicated in construction, inexpensive to manufacture, and dependable in use.

Briefly, the educational tool in accordance with this invention achieves the intended objects by featuring a frame supporting a pair of parallel rods. A number of beads are slidably positioned on one of the rods. A reckoning slide is slidably and rotatably positioned on the other of the rods for counting the beads. The reckoning slide has front and rear sides with ruled markings spaced from one another at a distance equivalent to that of the width of the beads. The front side has printed indicia between the ruled markings in the form of a first whole number sequence increasing from left-to-right. The rear side has printed indicia between said ruled markings in the form of a second whole number sequence increasing from right-to-left. By rotating the slide so that either its front of rear side faces a user, adjacent beads may be counted with reference to the indicia from left-to-right or right-to-left.

The educational tool also features a number of cards that are secured to the frame adjacent the rods. The cards bear printed indicia in the form of mathematics problems that can be solved with reference to the beads and the reckoning slide. Thus, the educational tool can provide a user with many opportunities to enhance mathematics skills.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
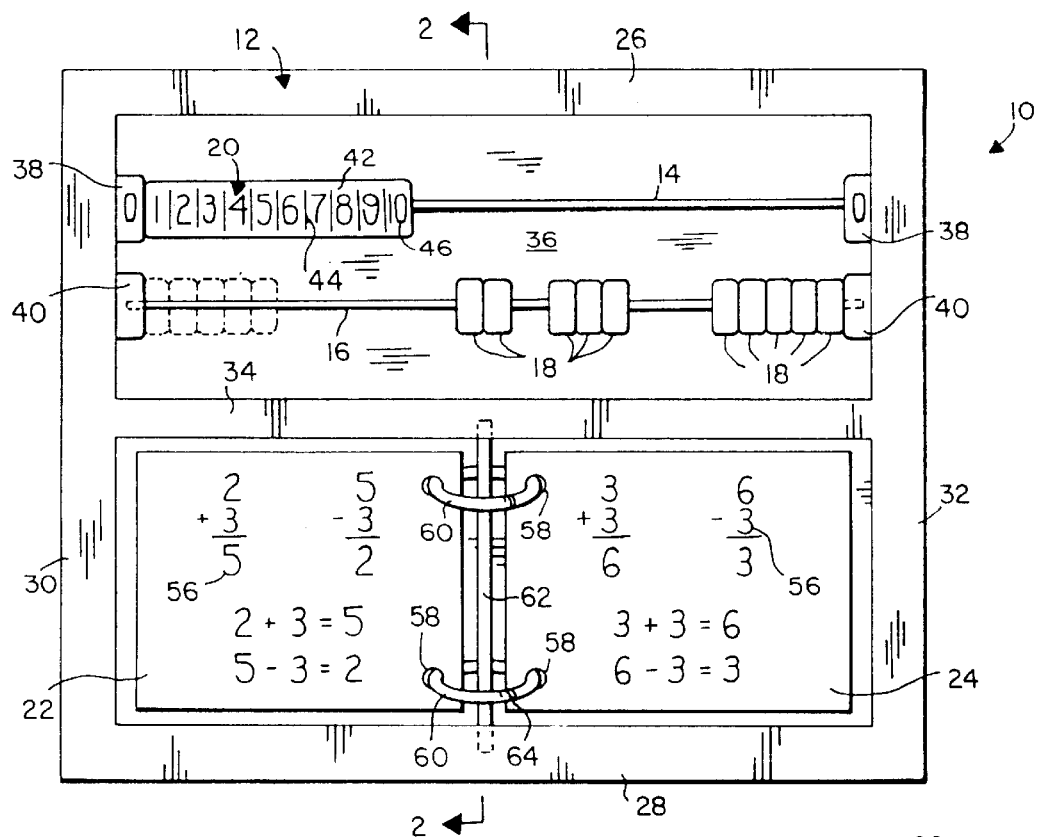
FIG. 1 is a front view of an educational tool in accordance with the present invention.

Referring now to the FIGS., an educational tool in accordance with the present invention is shown at 10. Educational tool 10 includes a frame 12 supporting a pair of parallel rods 14 and 16. A plurality of beads 18 is slidably positioned on rod 16. On rod 14, however, is slidably and rotatably positioned a reckoning slide 20 for counting beads 18. Suspended beneath rods 14 and 16 are cards 22 and 24 that illustrate mathematics problems that can be solved using beads 18 and slide 20 in combination.

Frame 12 includes top and bottom members 26 and 28 joined by a pair of side members 30 and 32 in a rectangular form. Midway between top and bottom members 26 and 28, a cross member 34 joins side members 30 and 32. A back plate 36 is affixed to top, bottom and side members 26-32 and serves to close the back of frame 12. The front of frame 12 is open so that beads 18 and slide 20 may be observed.

Rods 14 and 16 are of equal length and their opposite ends are affixed to side members 30 and 32 above cross member 34. Receptacles 38 and 40 are provided on side members 30 and 32 for respectively receiving the ends of rods 14 and 16 and reinforcing their connections to side members 30 and 32. Receptacles 38 and 40 also serve as stops for beads 18 and slide 20. Receptacles 38 and 40 may either be integrally formed with side members 30 and 32 or formed separately and attached with adhesives or other suitable means. Preferably, receptacles 38 and 40 have the same widths as beads 18.

Beads 18 are illustrated as being cylindrical in shape but may take any form capable of being easily grasped and manipulated by a user. For ease in conceptualizing and solving mathematical problems, however, beads 18 are preferably of uniform size and width. Any number of beads 18, can be positioned upon rod 16. When large numbers of beads 18 are utilized, it is a good idea to provide adjacent groups of, say, five beads with contrasting colors so that they may be easily distinguished from one another and easily counted.

The dimensions of reckoning slide 20 are important. Slide 20 has a length equivalent to that of cumulative widths of beads 18 so that all beads 18 can be positioned beneath slide 20 Slide 20 is also less than one-half the length of rod 14 so that all beads 18 can be positioned remote from slide 20 if desired.

Figure 2:
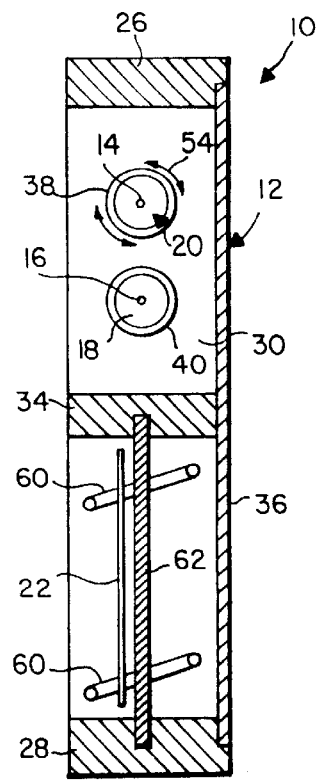
FIG. 2 is a cross-sectional view taken along line 2—2 of FIG. 1.

The front side 42 of slide 20 is provided with ruled markings 44 spaced from one another at a distance equivalent to the width of each of beads 18. Between ruled markings 44, slide 20 is provided with indicia 46 in the form of a sequence of whole numbers 1, 2, 3, 4, 5, 6, 7, 8, 9 and 10 increasing from left-to-right as they would ordinarily be read. Similarly, the rear side 48 of slide 20 is provided with ruled markings 50 like those on front side 42. Here, however, indicia 52 are a whole number sequence between markings 50 that increases from 1–10 in a right-to-left manner. A user may selectively bring either front side 42 or rear side 48 into view by rotating slide 20 on rod 14 as indicated by the arrows 54 in FIG. 2.

Figure 3:
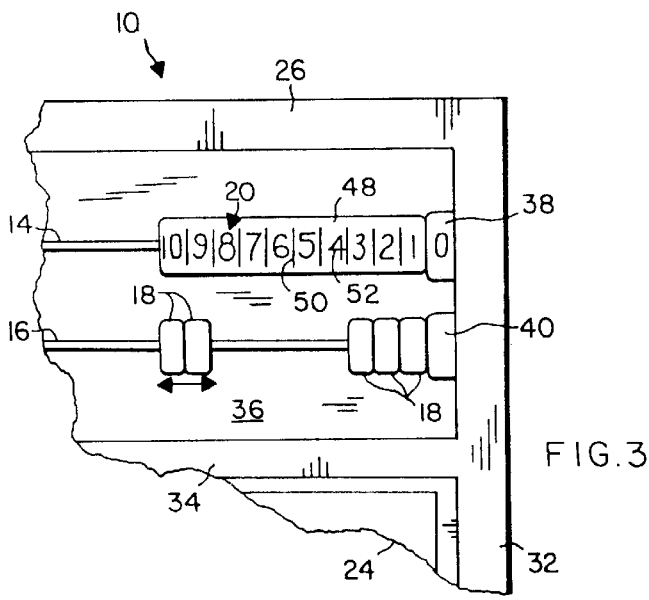
FIG. 3 is a front view of the educational tool with portions broken away showing an alternative positioning of the reckoning slide.

To assist a user in solving some mathematics problems, the number 0 is provided on each of receptacles 38 and 40. When front side 42 of slide 20 is facing a user and slide 20 is pressed against left receptacle 38 as shown in FIG. 1, the number sequence of 0–10 is presented to a user by tool 10. When, on the other hand, rear side 48 is facing a user and slide 20 is moved against right receptacle 38 as shown in FIG. 3, the number sequence of 10–0 is given.

Mathematics problems are offered to a user in the form of printed indicia 56 on flip cards 22 and 24. Addition and subtraction problems of a type that can be performed with beads 18 and slide 20 are shown in FIG. 1. The problems are presented in a horizontal and vertical format to present a user with varied challenges.

Cards 22 and 24 are provided with perforations 58 through which rings 60 are extended to attach such to a vertical post 62. Post 62 is positioned midway between side members 30 and 32 and has its opposed ends secured to bottom member 28 and cross member 34. Rings 60 may be split as at 64 so that cards 22 and 24 may be interchanged with others (not shown) to introduce additional mathematics problems to a user.

Use of educational tool 10 is straightforward. First, slide 20 is rotated so that front side 42 is facing a user and is abutted with left receptacle 38 as shown in FIG. 1. Next, a problem on one of cards 22 or 24 is selected. (For example, the problem in the upper left corner of card 22, 2+3=5, is selected.) Now, two beads 18 followed by three more beads 18 are moved to the broken line position of FIG. 1 beneath slide 20 and against left receptacle 40. A sum of "5" is obtained with reference to indicia 46 on slide 20 by counting the spaces between ruled markings 44 corresponding with those of the now adjacent beads 18 from left-to-right on slide 20. A mathematics problem such as this can be solved in a matter of seconds with tool 10.

Users who prefer to solve the same mathematics problem with tool 10 in a "reverse" or right-to-left counting manner may position slide 20 so that rear side 48 faces a user and slide 20 abuts right receptacle 38 as shown in FIG. 3. Then, the requisite number of beads 18 is positioned beneath slide 20 and their sum is obtained with reference to indicia 52. A user with difficulties in counting from left-to-right is, thus, accommodated by tool 10 and permitted to solve a problem by counting from right-to-eft. Both counting techniques are equally fast and yield identical, correct answers.

While the invention has been described with a high degree of particularity, it will be appreciated by those skilled in the art that modifications may be made thereto. For example, the number of beads 18 and corresponding markings 44 and 50 and indicia 46 and 52 on slide 20 may be increased or decreased to solve mathematics problems of greater or lesser complexity as desired. Therefore, it is to be understood that the present invention is not limited to the sole embodiment described above, but encompasses any and all embodiments within the scope of the following claims.

I claim:

1. An educational tool, comprising:
    a frame;
    a pair of parallel rods supported by said frame;
    a plurality of beads of equal width being slidably positioned on one of said parallel rods; and,
    a reckoning slide being slidably and rotatably positioned on the other of said parallel rods for counting said beads, said reckoning slide including:
        a front side and a rear side either of which may be selectively brought into view from said frame by rotating said reckoning slide, said front side having printed indicia in the form of a first whole number sequence increasing from left-to-right, and said rear side having printed indicia in the form of a second whole number sequence increasing from right-to-left.

2. The educational tool according to claim 1 wherein said indicia forming said first and second whole number sequences, respectively, are spaced from one another at a distance equivalent to the width of said beads.

3. The educational tool according to claim 1 wherein said reckoning slide has a length equivalent to that of cumulative widths of said beads and said reckoning slide has a length that is less than one-half the length of said rod upon which said reckoning slide is slidably and rotatably positioned.

4. The educational tool according to claim 1 further comprising a plurality of cards secured to said frame bearing printed indicia in the form of a plurality of mathematics problems that can be solved with said beads and said reckoning slide.

5. The educational tool according to claim 4 wherein said cards are suspended beneath said parallel rods.

6. An educational tool, comprising:
    a frame including:
        a top member and bottom member spaced therefrom;
        a pair of opposed, side members joining said top member and said bottom member;
        a cross member joining said side members midway between said top member and said bottom member; and,
        a back plate affixed to said top, bottom and side members;
    a pair of parallel rods supported by said side members between said top member and said cross member;
    a plurality of beads of equal width being slidably positioned on one of said parallel rods: and,
    a reckoning slide being slidably and rotatably positioned on the other of said parallel rods for counting said beads, said reckoning slide including:
        a front side and a rear side either of which may be selectively brought into view from said frame by rotating said reckoning slide, said front side having printed indicia in the form of a first whole number sequence increasing from left-to-right, and said rear side having printed indicia in the form of a second whole number sequence increasing from right-to-left.

7. The educational tool according to claim 6 further comprising a plurality of cards secured to said frame bearing printed indicia in the form of a plurality of mathematics problems that can be solved with said beads and said reckoning slide.

8. The educational tool according to claim 7 further comprising:
- a post positioned midway between said side members and having opposed ends secured to said bottom member and said cross member; and,
- a plurality of rings on said post and extending through said cards for securing said cards to said frame.

9. The educational tool according to claim 6 further comprising a plurality of receptacles affixed to, and projecting from, said side members for receiving the ends of said parallel rods.

10. The educational tool according to claim 9 wherein said receptacles receiving the ends of said rod supporting said reckoning slide are provided with printed indicia in the form of the numeral 0.

11. The educational tool according to claim 6 wherein said indicia forming said first and second whole number sequences, respectively, are spaced from one another at a distance equivalent to the width of said beads.

12. The educational tool according to claim 6 wherein:
- said parallel rods are of equal length;
- said reckoning slide has a length equivalent to that of cumulative widths of said beads; and,
- said reckoning slide has a length that is less than one-half the length of said rod upon which such is slidably and rotatably positioned.

13. An educational tool, comprising:
- a frame including:
  - a top member and bottom member spaced therefrom;
  - a pair of opposed, side members joining said top member and said bottom member;
  - a cross member joining said side members midway between said top member and said bottom member;
  - a plurality of receptacles affixed to, and projecting from, said side members between said top member and said cross member;
  - a post positioned midway between said side members and having opposed ends secured to said bottom member and said cross member; and,
  - back plate affixed to said top, bottom and side members;
- a pair of parallel rods supported by said side members had having opposed ends fitted within said receptacles;
- a plurality of beads of equal width being slidably positioned on one of said parallel rods; and,
- a reckoning slide being slidably and rotatably positioned on the other of said parallel rods for counting said beads, said reckoning slide including:
  - a front side and a rear side either of which may be selectively brought into view from said frame by rotating said reckoning slide, said front side and said rear side each having ruled markings spaced from one another at a distance equivalent to that of the width of each of said beads;
  - said front side having printed indicia between said ruled markings in the form of a first whole number sequence increasing from left-to-right; and,
  - said rear side having printed indicia between said ruled markings in the form of a second whole number sequence increasing from right-to-left.

14. The educational tool according to claim 13 wherein each of said receptacles receiving the ends of said rod supporting said reckoning slide are provided with printed indicia in the form of the numeral 0.

15. The educational tool according to claim 13 further comprising a plurality of cards secured to said frame bearing printed indicia in the form of a plurality of mathematics problems that can be solved with said beads and said reckoning slide.

16. The educational tool according to claim 13 wherein:
- said parallel rods are of equal length;
- said reckoning slide has a length equivalent to that of cumulative widths of said beads; and,
- said reckoning slide has a length that is less than one-half the length of said rod upon which such is slidably and rotatably positioned.

* * * * *